United States Patent Office 2,850,390
Patented Sept. 2, 1958

2,850,390

CHEESE PROCESS AND RESULTING PRODUCT

Donald M. Irvine and Walter V. Price, Madison, Wis., assignors to Wisconsin Alumni Research Foundation, Madison, Wis., a corporation of Wisconsin No Drawing. Application February 26, 1954
Serial No. 412,936

2 Claims. (Cl. 99—116)

The present invention relates to the cheese art. More specifically the invention is directed to an improved process for making high moisture cheese and the resulting cheese products.

The process of the present invention comprises the cooking of cheese curd having a pH of 5.9 and below in a fluid mixture containing salt (NaCl). The process can be readily carried out in two steps: (1) allowing the pH of the curd to drop to 5 to 5.9 by the growth of acid forming organisms in the curd, and (2) cooking the resulting curd in an aqueous brine mixture.

The many steps (including setting, cutting, cooking, cheddaring etc.) of the conventional process used in the manufacture of cheddar or American cheese are well known. Some of the operations are performed manually and inefficiently which results in high labor costs. The curd, for example, must be piled up along the sides of the vat, turned and cheddared and placed into the hoops. These are manual operations which take time, tie up equipment and materially raise the cost of the resulting cheese products.

To avoid the disadvantages referred to above, various modifications in the manufacture of American type cheeses have been suggested heretofore. An example is the process described in U. S. Patent 2,494,638. This patented process follows the conventional American or cheddar cheese processes up to and including the cooking step and then calls for draining off a portion of the whey, sufficient whey being retained to maintain a fluid mixture; then adding salt to the fluid mixture; then raising the temperature of the salted mixture rapidly to about 110–112° F.; then immediately separating the whey from the curd, then applying pressure of at least about 30 pounds per square foot to form the curd into a block, and finally curing the block of curd. The addition of the salt to the whey followed by the raising of the temperature is such as to drive water out of the curd and make it possible to readily produce a cheese with a moisture content materially below the usual moisture of most of the American types of cheese.

In the research leading to the discovery of the present invention, attempts were also made to avoid the time consuming and costly operations of the conventional American cheese process, and particularly the steps starting with the cheddaring operation. In one experiment carried out during this investigation the curd after setting, cutting and cooking and removal of the whey by draining was allowed to stand in an aqueous brine solution until the pH of the curd dropped from about 6.1 to about 5.6. The resulting mixture was then heated to a temperature of about 120° F. After draining of the brine the curd looked "different," e. g., moldable and plastic in character, and specifically not of the desired cheese making type. Although the experiment was considered to be an unsuccessful try showing no promise, the curd was placed in hoops and treated in the conventional manner to see what would happen. After a few days the curd was reexamined and unexpectedly found to have a relatively good texture, smooth consistency and a pleasant flavor. With a few weeks of curing it turned out to be a highly satisfactory new variety of cheese ready for marketing. This experiment originally considered to be one of the many "another try gone wrong" type resulted in the development of the invention described below.

The process of the present invention, preferably employs the normal operations of setting, cutting and heating such as used in the manufacture of rennet curd cheese. At this point, the curd which has a pH of about 6.1 or above is allowed in the present process to become acid within the range of about 5 to 5.9. This can be done in the whey or a portion of the whey, whey to which salt has been added or in an aqueous brine solution, moist curd from which the whey or brine has been drained, etc. If salt or a brine solution is employed in this step the concentration of the salt in the liquid should ordinarily not be above about 6 percent by weight with a range of about 2–4 percent being preferred. Higher concentrations of salt may be used with salt-tolerant organisms but are objectionable when using most lactic acid forming organisms as they slow up or retard the acid forming organisms and require longer periods of time for the curd to reach the desired acidity.

After the curd has reached a pH of about 5 to 5.9 and preferably 5.3 to 5.7, salt is added if it has not been added previously, and the resulting fluid mixture is then heated up to about 100 to 130° F. and preferably within the range of about 110 to 120° F. The liquid is then drained from the curd which after curing for a relatively short period of time produces a high moisture content cheese.

To produce a cheese characterized by a slightly acid, mild, pleasing flavor it has been found that at least 75 percent and preferably 85 percent or more by weight of the free-whey should be removed from the curd before the heat treatment. To provide a fluid mixture the whey should be replaced by or diluted with sufficient water or brine solution so that the liquid in the brine, curd and whey mixture prior to the heat treatment contains no more, e. g., up to or less than about 50 percent by weight of whey. The term "free-whey" refers to the whey which drains freely from the curd as distinguished from the relatively small amounts of whey which may exude from the curd particles on standing.

The brine used in the heat treatment step may be of various concentrations, e. g. 3–12 percent, although it is preferably around 4–6 percent. Lower concentrations result in the loss of milk salts from the curd. Higher concentrations produce no beneficial results and are objectionable as they tend to produce a high salt (NaCl) containing product.

One of the preferred methods of carrying out the process after the setting, cutting and heating operations is as follows. All of the free-whey (or at least 85 percent of the free-whey) is drained from the curd. The curd is then covered with an aqueous 2.5–3.5 percent brine solution. The resulting fluid mixture is allowed to stand at about 90–100° F. for about two hours with agitation. During this period the pH of the curd drops from about 6.1 or above to 5.4–5.6. Enough salt is then added to bring the concentration of salt in the brine solution to about 4.5–5.5 percent. The curd is allowed to stand in this mixture for a few minutes, e. g. 10 to 30 minutes. The mixture is then heated rapidly to about 110–130° F. The curd is then separated from the brine and the resulting curd finally cured. The above disclosed 90–100° F. temperature range has been found to be effective when using lactic cultures which usually contain *Streptococcus lactis* and *Streptococcus cremoris* and associated aroma-producing organisms. *Streptococcus thermophilus* which is used in the production of Parmesan and Swiss cheese may require slightly different temperatures and times for the optimum development of the desired characteristics. Other types of organisms which are heat and salt tolerant may be used, if desired, to produce their effects in the finished product.

The curd employed in the process of the present invention can be any cheese curd. The conventional unripened rennet curds such as used in the manufacture of cheddar, brick, romano, limburger, Swiss, etc. cheeses are preferred. Their preparation is described in the Federal Register of August 24, 1950, volume 15, 164, columns 5673 to 5684, sections 19.500 to 19.685. After setting, cutting (or stirring to break up the curd) and heating i. e., at the time of dipping, the pH values of these and like curds is about 6.1 and above. For example, the cheddar curd has a pH of about 6.1; the brick curd has a pH of about 6.3–6.45; the romano curd has a pH of about 6.3–6.45; the limburger curd has a pH of about 6.2–6.3; and the Swiss curd has a pH of about 6.2–6.3. In the process of the present invention it is essential, prior to the final heating operation carried out in brine, that the pH of the curd drop from about 6.1 or above to pH 5.9 or below. This is preferably done by the use of acid forming organisms which grow in the curd at temperatures around 86–102° F. and liberate lactic acid in situ.

The pH of the curd can also be lowered by addition of acid, e. g. lactic acid, acetic acid, hydrochloric acid and the like. Highly acid curds can also be employed. To obtain cheese products ordinarily preferred by the public, however, it has proven highly advantageous to take rennet curd at the time of dipping and allow the pH to drop by acid forming organism growing in the curd.

In carrying out the final heating or cooking operation it has been found important to have the brine in intimate contact with the curd. To provide for this, i. e., for diffusion of the salt throughout the curd, it is preferred to have the curd dispersed in a brine containing medium at the time the acid forming organisms are growing and the pH of the curd is dropping. During this holding period prior to cooking, the curd also undergoes desired physical and chemical changes in the presence of the brine. In addition, this procedure, i. e. the bringing down of the pH of the curd in brine, has also been found to make it readily possible to control the physical consistency, flavor and odor of the final product.

The temperatures employed in the final heating or cooking operation can be about 100° F. and higher with temperatures around 110–120 being preferred for most operations. Somewhat lower temperatures as well as higher temperatures with longer or shorter heating periods can also be employed. Temperatures approaching 145° F., however, adversely affect the aging organisms and should ordinarily be avoided.

The following detailed example of a preferred procedure will serve to illustrate the invention.

*Example*

About 5,000 pounds of milk of about 3.5 percent fat, pasteurized in a flash-plate pasteurizer, was first pumped to a steam jacketed stainless steel vat of the type used for carrying out the usual cheddar or American cheese process. The milk was next brought up to a temperature of about 86° F. and inoculated with approximately one percent starter of the *Strep. lactis* type. After thorough agitation, the inoculated milk was allowed to stand for about 30 to 60 minutes.

The milk was then "set" with about 15 ounces of rennet, thoroughly stirred and left in a quiescent state for about 30 minutes. As soon as the curd became firm it was cut into cubes with the conventional ¼ inch knives and left in the whey with no stirring for about 5 minutes. The mixture was then subjected to gentle stirring.

About 15 minutes after cutting, the curd and whey were heated gently at about the following rate:

0 minute, 86° F.
5 minutes, 88° F.
10 minutes, 90° F.
15 minutes, 93° F.
20 minutes, 96° F.
25 minutes, 99° F.
30 minutes, 102° F.

After this 30 minute heating or cooking operation, the curd and whey were left agitated by mechanical agitators until about 2½ hours after the addition of the rennet. At this time with the lactic organisms growing rapidly, the acidity of the whey is about 0.14 percent and the curd has a pH of about 6.1. The free-whey is then completely drained from the curd.

About 1,250 pounds of a 3 percent brine (i. e. the brine is ¼ the weight of the milk) at 98° F. was next added to the granular curd and the resulting mixture agitated for about two hours. When the pH of the curd was about 5.5 enough salt (NaCl) was added to bring the brine concentration up to 5 percent. The curd was left in this brine solution for about fifteen minutes and the mixture then heated to about 118–124° F. As soon as this temperature was reached, the curd and brine were pumped to a draining rack. After draining the curd was placed in conventional hoops with bandages. The following day the fresh green curd was taken from the hoops and dried in a drying room for about one day. The cheese was then paraffined and allowed to cure at about 45° F. In one month the cured cheese has a good body and flavor and is ready for the market. Other rennet curds such as brick, romano, Swiss, etc. can be employed in place of the cheddar curd used in this example. Except for slight differences in pH at the time of dipping, the curds are similar and the processes employed are the same as those described above.

To obtain a mild, slightly acid cheese of the type generally preferred by most taste panels, it is important, as noted above, that at least 75 percent of the free-whey, and preferably 85 percent of the free-whey be removed prior to heating the acid curd in the brine solution. The presence of more whey produces a highly acid cheese with a somewhat "bitter" type taste. The time of contact and concentration of the brine is a relationship that may be readily controlled to produce a product of the desired type. This relationship also controls the salt content in the final product which, like acidity, may vary with consumer tastes.

The curd produced by the present invention has a very rapid body breakdown. The "curdiness" of the cheese, for example, generally disappears in two weeks or less to yield a product with the desired texture. The resulting cheese is of the high moisture content type, e. g., contains 40 up to 50 percent or more of moisture, and is characterized by a soft spreading or slicing body similar to process cheese or cheese spread. At 42–45 percent moisture the cheese has excellent slicing properties while above 45 percent moisture the cheese has excellent spreading properties.

The process of the present invention can be modified in various ways. For example, while the brine is usually added after the whey or a portion of the whey has been removed, when the curd is firm, at the time of dipping, it will be understood that in the conditioning of the curd for our special procedure the whey may be removed and water, or brine, added at an earlier time in the operation. Thus NaCl could be added to the whey, or water or water brine added to, or substituted for, the whey soon after the curd is cut, rather than after the initial heating or cooking operation. This would be advantageous if an especially rapid acid development were desired to shorten the curd-making process or to control the condition of the curd or if it were necessary to use milk with unusually high acidity at the time of adding rennet. Also, while the cheese products usually preferred by the consumer are characterized by having pH values above 5.0 it will be understood that the process of the invention may be employed on curds of pH below 5.0 to produce products of highly acid flavor.

The curd produced by the present invention may be pressed in hoops and cured in bandages, flexible films, etc. in accordance with standard practices in the art. It, however, does not have to be pressed but can be shaped by placing the hot curd in molds like those commonly used in shaping munster, limburger, etc. The curd also may be subjected to various other operations known in the food industry art. The warm curd, for example, is soft and plastic enough to be used on a piston type of filler, and may be filled in plastic bags in a sausage-machine type operation. The curd may be mixed with condiments before the pumping and draining operation. Enzymes may be added, such as Italase and Capalase. The soft and plastic curd may also be kneaded in an operation similar to that of Italian cheese. The curd may also be subjected to a smoking operation. Molds may be used as employed, for example, in the manufacture of Camembert. A smear-ripening operation such as brick or limburger can also be employed to modify the flavor of the final product. In addition, the curd may be incorporated in or mixed with or without the application of heat, with other curds, green curds or cheeses to produce modified products of various types such as those known in the art as cold pack and club cheeses. The curd obtained in the process of the present invention is unique in this respect for while it can be cured to produce a highly satisfactory soft or semi-soft cheese, it is also particularly adaptable for use in the manufacture of various types of cheese products, such as process cheese and process cheese spreads. The process may also be advantageously employed with substitute fats (vegetable fats, etc.) to make filled cheese products.

The final cheese product is also uniquely adaptable for various uses such as those described above with reference to the curd and for combination with meats, vegetables and various other foods. Partially ripened curds as well as the green curd can also be used as described above to make various types of cheese and cheese products.

The making of cheese with the brine heating operation of the present invention is simpler than common cheese making operations. As the curd-brine mixture can be pumped to a draining table or hopper it lends itself readily to mechanization. This makes possible a substantial reduction in time and labor resulting in a material reduction in overall costs. At the same time it provides a highly satisfactory new cheese not available heretofore. Other non-toxic alkali metal salt brines may be used in place of sodium chloride (e. g. potassium chloride, sodium citrate, etc.) although the use of at least some sodium chloride is preferred.

The chemistry involved in the process of the present invention is not fully understood. It appears, however, that a calcium-sodium exchange is involved resulting in the formation of some soluble sodium paracaseinate. That the factors involved are complex, however, may be illustrated by the following. In normal cheesemaking procedure, the higher the temperature, the lower the moisture in the curd. Also, salt is normally considered as contributing to a low moisture curd. These are both exemplified by the heating in brine process described in Patent 2,494,638 mentioned above where water goes out of the curd to make a low moisture cheese. In addition, in normal cheesemaking procedure, as the acidity of the curd increases, the moisture decreases. The lower pH (higher acidity), like the higher temperature, acts to shrink the curd and this eliminates water. These facts, which are common knowledge, are exactly contrary to the results obtained by the special procedure of the present invention where the moisture increases with increasing temperatures and decreasing pH in brine. In other words, the novel conditions employed in the present process result in water going into or being retained in the curd to make a high moisture cheese. The reasons for these results, which are just the opposite to that experienced in normal cheese-making procedures, have not been fully demonstrated at the present time.

The present application is a continuation-in-part of our prior application Serial No. 296,712, filed July 1, 1952, now abandoned.

We claim:

1. In the process of manufacturing a high moisture, quick curing cheese particularly adaptable for use in cheese spreads, in which the milk is set and the resulting curd is cut and cooked in whey, the improvement which consists in removing at least about 75% of the free-whey from the curd, adding sufficient aqueous brine of about 2–4% concentration to the curd to provide a fluid mixture, allowing the lactic acid organisms present in the curd to grow until the pH of the curd drops to about 5.3–5.7, adding sufficient salt to the mixture to bring the concentration of the brine up to about 4–6%, heating the resulting acidic curd while in fluid mixture in the brine to about 110–130° F., separating the cooked curd from the brine, and finally curing the curd.

2. In the process of manufacturing a high moisture, quick curing cheese particularly adaptable for use in cheese spreads, in which the milk is set and the resulting curd is cut and cooked in whey, the improvement which consists in draining the free-whey from the curd, adding sufficient aqueous brine of about 2.5–3.5% concentration to the curd to provide a fluid mixture, allowing the lactic acid organisms present in the curd to grow until the pH of the curd drops to about pH 5.5, adding sufficient salt to bring the concentration of the brine up to about 5%, heating the resulting acidic curd while in fluid mixture in the brine to about 118–124° F., separating the cooked curd from the brine, and finally curing the curd.

References Cited in the file of this patent

UNITED STATES PATENTS

| Number | Name | Date |
|---|---|---|
| 30,638 | McAllister | Nov. 13, 1860 |
| 1,334,693 | Doane | Mar. 23, 1920 |
| 1,868,422 | Luecke | July 19, 1932 |
| 2,251,496 | Parsons | Aug. 5, 1941 |
| 2,322,148 | Lane et al. | June 15, 1943 |
| 2,494,638 | Stine | Jan. 17, 1950 |